US005430923A

United States Patent [19]

Parent et al.

[11] Patent Number: 5,430,923

[45] Date of Patent: Jul. 11, 1995

[54] METHOD FOR REMOVING A CAP FROM A CONTAINER WITH A CAP ENGAGING UNIT

[75] Inventors: Donald G. Parent, Windham; Gary Keene, Waterville, both of Me.

[73] Assignee: Leon S. Trenholm, Portland, Me.

[21] Appl. No.: 139,734

[22] Filed: Oct. 22, 1993

Related U.S. Application Data

[62] Division of Ser. No. 875,395, Apr. 29, 1992, Pat. No. 5,271,296.

[51] Int. Cl.[6] .............................................. B23P 19/00

[52] U.S. Cl. ...................................... 29/407; 29/426.5; 29/456; 81/3.2

[58] Field of Search ..................... 29/407, 426.1, 426.5, 29/456; 81/2.2, 3.25, 3.31, 3.32, 3.33, 3.07

[56] References Cited

U.S. PATENT DOCUMENTS

| | | | |
|---|---|---|---|
| 2,761,337 | 9/1956 | Daniel | 81/3.4 |
| 3,795,158 | 3/1974 | Morita | 81/3.32 |
| 3,950,801 | 4/1976 | Morrison | 81/3.33 |
| 4,171,650 | 10/1979 | Cardinal | 81/3.2 |
| 4,607,196 | 8/1986 | Abrahams et al. | 81/3.32 X |
| 4,762,029 | 8/1988 | Chen | 81/3.2 |
| 4,919,014 | 4/1990 | Chen et al. | 81/3.2 |
| 5,003,844 | 4/1991 | Barrow | 81/3.2 |
| 5,167,172 | 12/1992 | Heebner | 81/3.2 |
| 5,329,831 | 7/1994 | Pierce, Jr. et al. | 81/3.2 X |
| 5,345,844 | 9/1994 | Marsaw | 81/3.2 |

FOREIGN PATENT DOCUMENTS

| | | | |
|---|---|---|---|
| 0226485 | 10/1991 | Japan | 81/3.2 |

*Primary Examiner*—S. Thomas Hughes

*Attorney, Agent, or Firm*—Sixbey, Friedman, Leedom & Ferguson

[57] ABSTRACT

The automated container cap remover and method for cap removal includes a drive for causing relative rotation to occur between a container cap and a cap engaging unit. The drive brings the cap engaging unit into engagement with the cap and then slips to permit the cap to be unscrewed from the container. A control unit senses the torque created by the relative rotation between the cap and cap engaging unit, and when a drop in torque is sensed, the control unit causes the drive to move the cap and cap engaging unit out of engagement.

7 Claims, 3 Drawing Sheets

METHOD FOR REMOVING A CAP FROM A CONTAINER WITH A CAP ENGAGING UNIT

This is a Divisional application of Ser. No. 07/875,395, filed Apr. 29, 1992, now U.S. Pat. No. 5,271,296.

TECHNICAL FIELD

The present invention relates generally to methods and devices for gripping and removing a screw-on cap from a container, and more particularly to an automated container cap remover which operates in response to a torque curve occurring during a cap removal operation.

BACKGROUND OF THE INVENTION

It is often extremely difficult to remove a screw-on cap from a container, such as a jar or bottle, and this is particularly true when a negative pressure is present in the container. The difficulties experienced by persons with no physical impairments in the manual removal of screw-on caps from containers are often magnified to insurmountable levels for persons who are physically impaired.

For many years, attempts have been made to develop devices to remove the screw-on caps from containers. U.S. Pat. No. 2,761,337 to Daniel discloses a manually operable gripper cone which assists the user in the manual removal of a container cap, and the development of these manual devices ultimately led to the design of motor driven bottle closure openers. U.S. Pat. Nos. 4,762,029 and 4,919,014 to Chen both disclose bottle closure openers which are motor driven and which include an angled cap engaging member to remove a cap from a bottle. In these units, a platform supporting the bottle moves the bottle upwardly into engagement with a rotating cap engaging member.

Similarly, U.S. Pat. No. 4,171,650 to Cardinal illustrates a jar lid loosening device wherein a jar supporting base moves a jar upwardly into contact with a cap removing clamping unit which is driven by a separate motor to remove the cap.

In the previously known motor driven container cap removers, it has been necessary to raise a stationary container into engagement With a rotating cap remover, an operation which often requires the use of multiple motors and a complex drive system. Often it is difficult to accurately control the upward movement of a container so as to maintain sufficient pressure between the container cap and the rotating removal device for cap removal while preventing the application of excessive pressure which will break or damage the container. As the cap is unscrewed, it moves longitudinally away from the container, and if effective compensation for this longitudinal movement is not provided, the increase of pressure on the container can result in damage to either or both the container and cap.

Finally, in known motor driven units where a stationary container is raised into contact with a rotating cap removal device, there is a tendency for the initial contact to cause the container to slip and rotate relative to its supporting base until sufficient pressure is applied longitudinally of the container to preclude this slipping movement. This pressure can be in excess of that which would be required to remove the cap if container slippage relative to the supporting base did not occur, and the presence of this higher pressure increases the likelihood that the container or cap will be damaged.

DISCLOSURE OF THE INVENTION

It is a primary object of the present invention to provide a novel and improved automated container cap removal method and device which operate in response to the torque curve occurring during a cap removal operation.

Another object of the present invention is to provide a novel and improved automated container cap remover which causes a nonrotating cap removal device to be lowered into Contact with the cap of a rotating container thereby utilizing the kinetic energy of the rotating container to minimize the likelihood of slippage between the container and the container support base.

A further object of the present invention is to provide a novel and improved automated container cap remover which operates effectively to permit a cap which is unscrewed thereby to move longitudinally upwardly from the container without significantly increasing the pressure on the cap or the container.

A still further object of the present invention is to provide a novel and improved automated container cap remover which causes a nonrotating cap removal device to be lowered into contact with the cap of a rotating container by means of a slip clutch drive which begins to slip as a maximum torque level is reached. Slippage of the clutch drive increases to permit the cap to raise from the container without significantly increasing the pressure on the container, and when the torque curve resulting from the cap removal operation drops to a predetermined level, the cap removal device is moved upwardly away from the cap.

DETAILED DESCRIPTION

Figure 1:
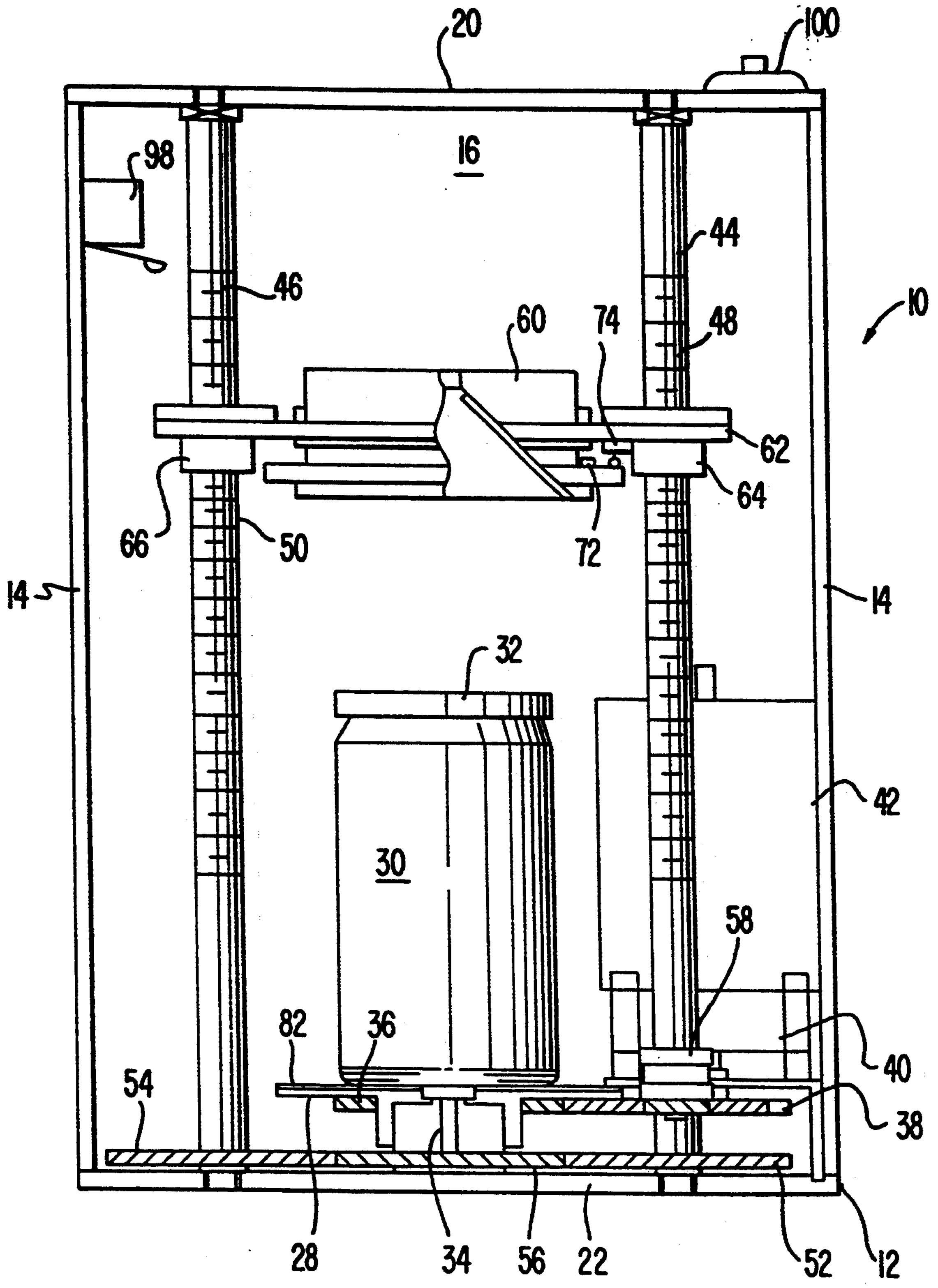
FIG. 1 is a sectional view of the automated container cap remover of the present invention.
Figure 2:
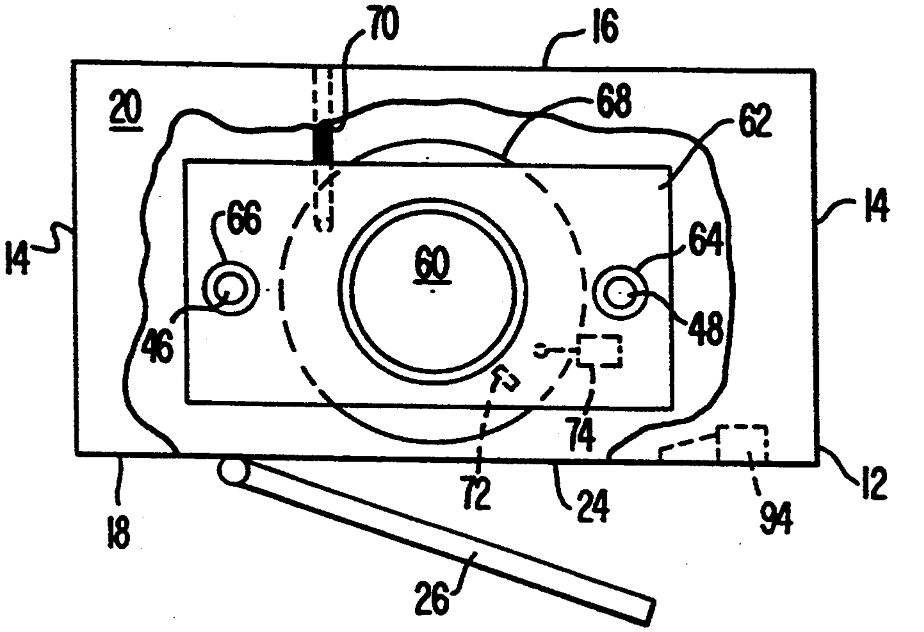
FIG. 2 is a top cutaway view of the automated container cap remover of FIG. 1.
Figure 3:
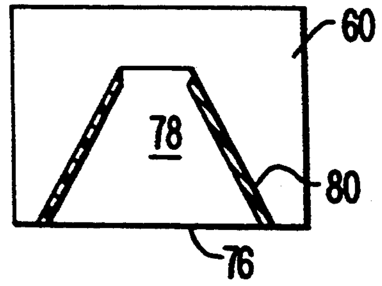
FIG. 3 is a sectional view of the gripper housing for the automated container cap remover of FIG. 1.

Referring now to FIGS. 1 and 2, the automated container cap remover 10 of the present invention includes a housing 12 having parallel spaced sidewalls 14, a rearwall 16 and a front wall 18 which extend in spaced, relationship between the sidewalls 14, and a topwall 20 and a bottomwall 22 which extend in substantially parallel, spaced relationship across the opposite ends of the rear, front, and sidewalls of the housing. The frontwall 18 of the housing 12 is provided with a large access opening 24 which is of a size sufficient to permit containers of various sizes to be inserted into and removed from the housing, and this access opening is closed by a hinged access door 26.

Mounted for rotation within the housing 12 is a rotatable support base 28 adapted to receive a container 30 having a screw-on cap 32 which is to be removed. The support base is mounted for rotation on a central support shaft 34 and is driven by means of a gear 36 which is secured to the support base. The gear 36 meshes with a drive gear 38 that is driven directly by an electric motor 40 contained in a motor and control circuit housing 42.

On either side of the support base 28 are substantially parallel lead screws 44 and 46 which extend between the top wall 20 and the bottomwall 22 of the housing 12 and which are journaled at either end for rotation. The lead screw 44 and 46 are each threaded lengthwise as indicated at 48 and 50, and each lead screw includes a gear secured to the bottom section thereof as indicated at 52 and 54. The gears 52 and 54 mesh with an idler gear 56 mounted for free rotation about the support shaft 34 to ensure that both lead screws are rotated at the same speed. The lead screws are driven by the drive gear 38 which meshes with a slip clutch 58 that is mounted to drive the lead screw 44. As the lead screw 44 rotates, it in turn drives the lead screw 46 by means of the gears 52, 56 and 54. When the torque on the lead screw 44 exceeds a torque level set for the slip clutch 58, the slip clutch will begin to slip to an extent that can eventually permit reverse rotation of the lead screws 44 and 46 in a direction opposite to that resulting from drive by the drive gear 38.

A gripper housing 60 is mounted upon the lead screws 44 and 46 by means of a gripper plate 62 which supports the gripper housing. Threaded bushings 64 and 66 extend through opposite sides of the gripper plate and receive the lead screws 44 and 46 respectively. The gripper housing 60 is free to rotate relative to the gripper plate 62.

Extending outwardly from the gripper housing 60 and spaced below the gripper plate is a torque plate 68 which is fixed to the gripper housing and which rotates therewith. The torque plate is biased against rotation, and in its simplest form, this bias may be provided by a spring 70 which extends between the torque plate and any stationary member, such as the gripper plate or the backwall 16 of the housing 12. When sufficient rotational torque is applied to the gripper housing 60 to overcome the bias of this spring 70, both the gripper housing and the torque plate 68 will rotate against the bias of the spring, and with this rotation, a projection 72 on the torque plate will contact and close a torque switch 74 which is mounted on the underside of the gripper plate 62.

The bottom of the gripper housing 60 is provided with a circular opening 76 which opens into a cone shaped chamber 78. The walls of the chamber 78 are lined with high friction material 80, and the same high friction material 82 lines the upper surface of the support base 28.

Figure 4:
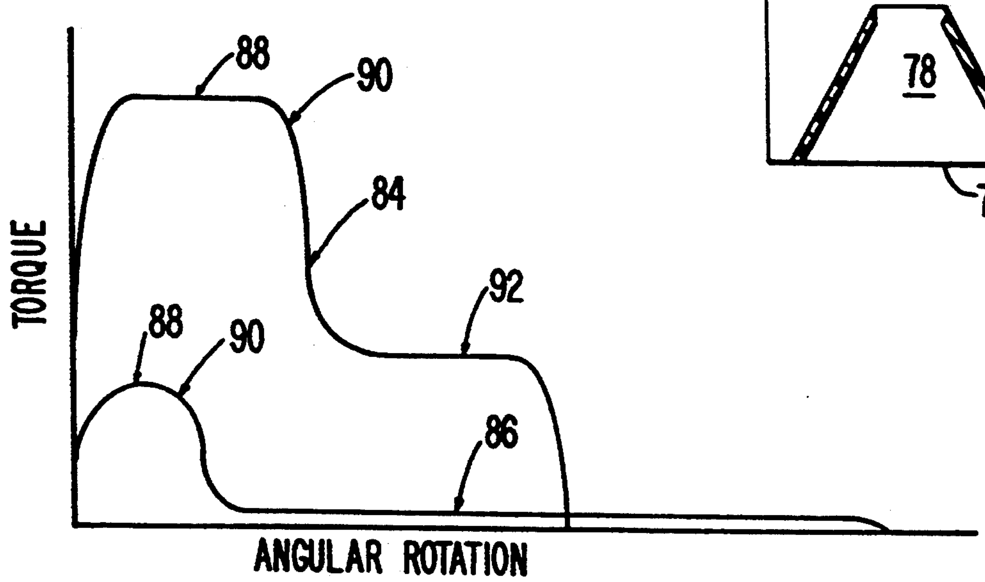
FIG. 4 is a torque curve diagram of torque curves generated during the removal of container caps by the automated container cap remover of FIG. 1.

The torque/rotational displacement curve shown in FIG. 4 is common to virtually all jar and bottle caps, which are threaded onto screw threads at the mouth of a container, and this curve is the basis for the operation of the automated container cap remover 10. As shown in FIG. 4, the torque curve for a large container is indicated at 84, and 86 indicates the torque curve for a small container. For a tight container cap, torque increases rapidly to a maximum point 88 on the torque curve, where the cap begins to rotate. This maximum torque is often determined by the frictional coefficient of the cap seal and the negative pressure in the jar, bottle or other container. Although different jar or bottle types and sizes will have different torque/rotational displacement curves, the basic curve shapes are similar. Thus, torque rises to the maximum point 88 at the start of cap rotation and then at some point 90, usually when the container seal is broken, the torque starts to drop off to a lower value. This lower value of torque, indicated at 92, remains while the cap is being unscrewed, at which point the cap will fall off its mating thread onto the next adjacent thread, and torque will go to zero.

Figure 5:
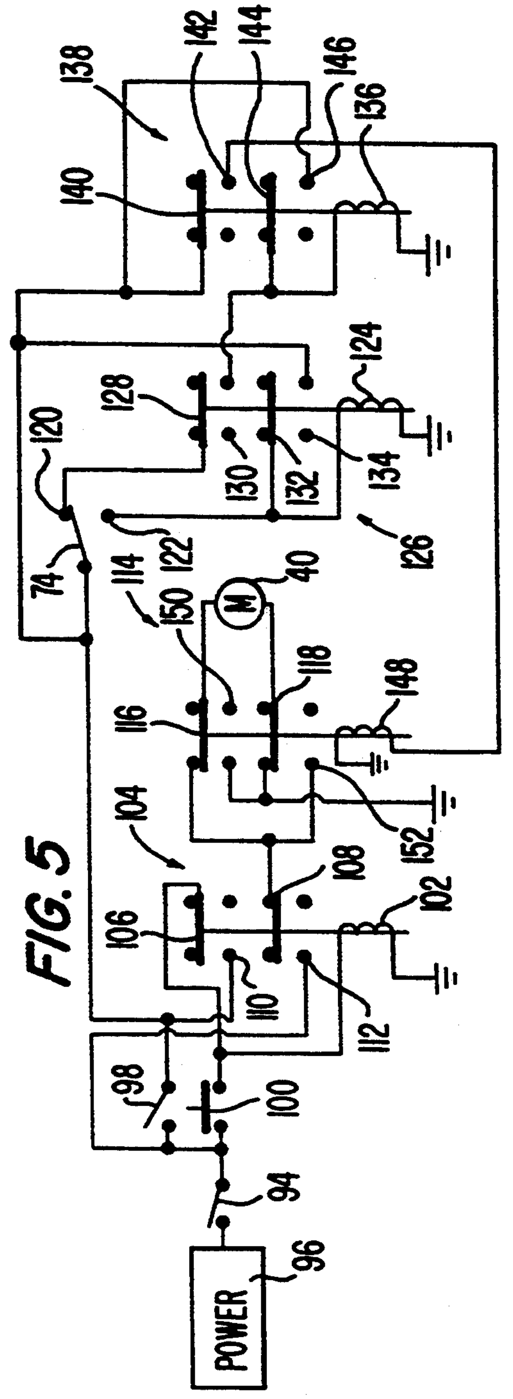
FIG. 5 is a circuit diagram of a control circuit for the automated container cap remover of FIG. 1.

The manner in which the automated container cap remover 10 of the present invention uses the torque curve of FIG. 4, will best be understood with reference to the control circuit of FIG. 5 in combination with the mechanical structure disclosed in FIGS. 1 and 2. Initially, a container 30 is inserted into the housing 12 through the access opening 24 and is placed upon the support base 28 as illustrated in FIG. 1. Now, the access door 26 is closed, and closure of this door causes a door closure switch 94 to close thereby completing a circuit to a power supply 96.

At the beginning of a cycle of operation for the automated container cap remover 10, the gripper housing 60 is in its uppermost position on the lead screws 44 and 46, and the gripper plate 62 contacts and opens a normally closed switch 98. Operation is now begun by momentarily closing a normally opened start switch 100 which is mounted for actuation on the exterior of the housing 10. When the start switch 100 is depressed and momentarily closed, power from the power supply 96 passes across the switch 94 and the switch 100 to energize the coil 102 for a relay switch 104. Energization of the coil 102 causes a switch 106 to be drawn into contact with relay switch contacts 110 and a switch 108 to be drawn into contact with relay switch contacts 112. Power is now provided across the switch 106 and the relay contacts 110 to the torque switch 74 and similarly power is provided across the switch 108 and the switch contacts 112 to a second relay switch 114. As will be noted in FIG. 5, power initially applied to the relay switch 114 passes across a switch 116 and a switch 118 to ground to energize the motor 40. The motor 40 is energized by the switches 116 and 118 so that it will rotate in a direction that will cause the lead screws 44 and 46 to lower the gripper plate 62. As the gripper plate lowers, the normally closed switch 98 which has been held opened by the gripper plate now closes, and power across this switch to the relay contacts 110 and across the switch 106 maintains the energization of the relay coil 102. Thus, this coil will remain energized as the start switch 100 is released to again open the start switch contacts.

The motor 40 not only rotates the lead screws 44 and 46 to lower the gripper plate 62, but also rotates the support base 28 in the direction required to unscrew the cap 32 on a right hand container thread. The gripper plate descends until the walls of the cone shaped chamber 78 in the gripper housing 60 contact and grip the container cap 32. This gripping of the cap as a downward force continues to be applied by the gripper housing 60 produces a torque in the proper direction to unscrew the cap from the container. The downward force is controlled by the slip clutch 58 which begins to slip when a predetermined downward force is reached, and ultimately, as the cap 32 begins to unscrew and rise, the slip clutch will actually rotate in a reverse direction permitting the gripper housing 60 to move upwardly with the cap.

The rotational torque applied to the gripper housing 60 by the rotating container cap 32 causes the gripper housing to rotate relative to the gripper plate 62 against the bias of the spring 70, to move the torque switch 74. The torque switch 74 will now move from normal engagement with a switch contact 120 to a switch contact 122, and the coil 124 of a relay switch 126 will be energized. This causes a switch 128 to move into contact with relay switch contacts 130 and a switch 132 to move into contact with relay switch contacts 134, thereby placing the circuit in a prereverse phase.

When the container cap 32 is completely unscrewed, it will suddenly fall from the rising thread on the container to the next rising thread. This causes a sudden loss of torque which permits the spring 70 to reverse the rotation of the torque plate 68 until the torque switch 74 again moves into contact with the switch contact 120. Previous to this the bridging of the contacts 134 by the switch 132 provided an energization circuit for the coil 124, so that the coil remains energized when the torque switch moves to the contact 120. Now power will be provided across the switch 128 to energize a coil 136 for a relay switch 138. This causes a switch 140 to bridge relay switch contacts 142 and a switch 144 to bridge relay switch contacts 146 so that a relay coil 148 for the relay switch 116 will be energized across the switch 140 and relay switch contacts 142. This causes the switch 116 to move downward and bridge relay switch contacts 150 while the switch 118 moves downwardly to bridge relay contacts 152. This reverses the power circuit to the motor 40 causing the motor to reverse so that the lead screws 46 and 48 drive the gripper plate 62 upperwardly. This upperward motion continues until the gripper plate contacts the normally closed switch 98 and opens the switch to break the power circuit for the motor 40. Now, the access door 26 to the housing 12 can be opened for the removal of the container 30, thereby opening the switch 94 and terminating the provision of power from the power supply 96.

The control circuit for the automated container cap remover 10 which is shown by FIG. 5 operates on the basis of the torque curve of FIG. 4, and a salient feature of this curve is that the motor 40 is reversed when the sensed torque drops to approximately zero. This system would operate well for containers 30 which are of relatively the same size, but a problem could exist when containers of substantially different sizes are to be opened. Referring to the curves of FIG. 6, it will be noted that in a system which operates to reverse the motor 40 when the absolute torque on the gripper plate 62 drops below a certain threshold value (approximately zero), this threshold value is as indicated by the dashed lines A1 and A2 for large and small containers respectively. From this, it will be noted that the threshold value A1 which works well with a large jar curve 84 would not work at all with the small jar curve 86. Since a torque must first be applied which rises above the threshold value for the device if the device is to detect the subsequent drop of torque below the threshold, it is obvious that this would not occur with smaller containers. Conversely, the result of selecting a threshold value at A2 to control the automated container cap remover can would be that the motor 40 would reverse promptly for small containers, but for large containers would not reverse until long after the cap was completely unscrewed from the container. To eliminate these problems, an ideal situation would be for the opening cycle to reverse shortly after the container seal is broken but before the torque drops to substantially zero and the cap is substantially removed from the container.

Figure 7:
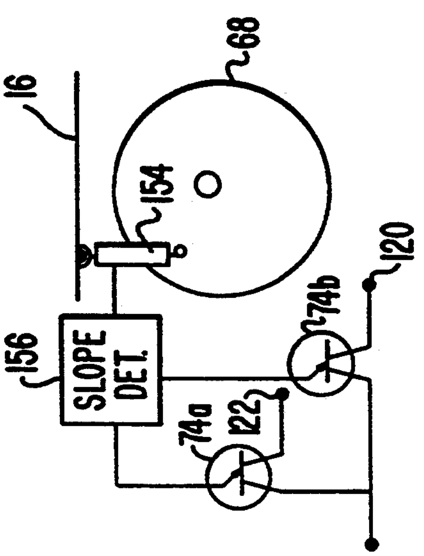
FIG. 7 is a diagram of an analog torque curve sensing unit for use with the circuit of FIG. 5.
Figure 6:
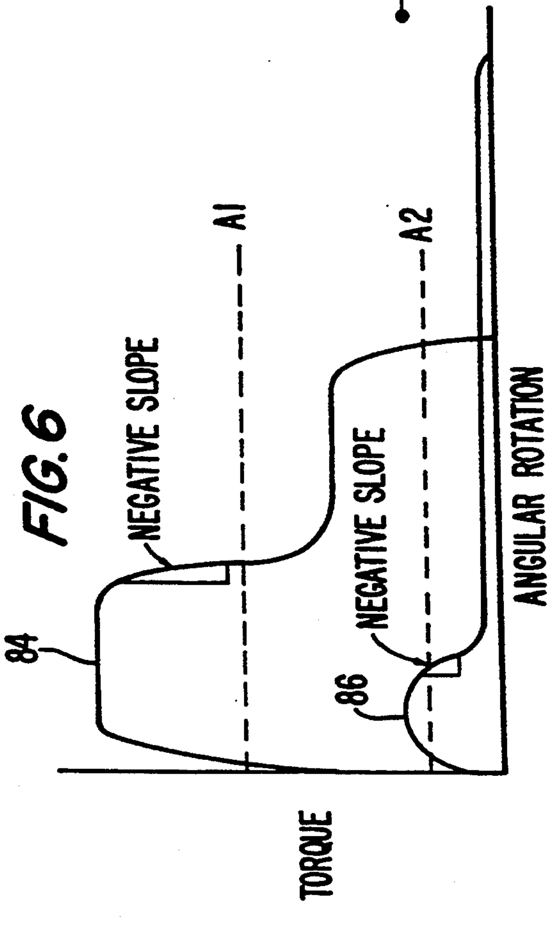
FIG. 6 is a torque curve diagram showing the negative slope characteristic for torque curves generated by the automated container cap remover of FIG. 1.

It will be noted from the curve of FIG. 6 that there is a negative slope characteristic present for each curve in the region where the seal between the cap and the container is broken. These negative slope regions are a common characteristic of the torque curve for every container cap, and they are not dependent upon the absolute magnitude of torque. Thus, once the slope of the torque curve goes negative, the container seal can be assumed to have been broken and it is advantageous to reverse the motor 40 at this time. To accomplish this reversal of the motor 40 in response to the detection of a negative slope characteristic rather than the detection of zero torque, a number of different devices, both mechanical and electrical can be employed to detect the negative slope region of the torque curve. For example, as indicated by FIG. 7, the spring 70 could be replaced by an analog torque detection unit 154 which provides an analog output signal indicative of the torque placed on the torque plate 68. This analog output signal would be directed to a slope detector 156 which would sense when the torque is initiated to energize an electronic switch **74*a* to complete a circuit to contact 122 in FIG. 5. When analog signal indicates a transition to the negative slope portion of the torque curve, the slope detector would trigger an electronic switch 74*b* to complete the circuit to the contact 120 in FIG. 5 while terminating conduction of electronic switch 74*a***.

A number of mechanical devices can be employed to sense the torque curve of FIG. 6. An example of one such device would be a reaction linkage connecting the torque plate 68 to a stationary object such as the housing wall 16. This reaction linkage would include a high viscosity liquid for transmitting force, and a sudden loss of torque on the torque plate 68 would transmit force through the high viscosity liquid which would be proportional to the rate of change of torque. This transmitted torque could be used to move the switch 74 from contact 122 to contact 120.

Finally, it is obvious that the torque curve of FIG. 6 could be monitored by a microprocessor which would calculate the torque curve slope to determine the slope sign change. As soon as the negative slope for the torque curve is detected by the microprocessor, the microprocessor will activate an electronic switch 74 to move power from the contact 122 to the contact 120.

Industrial Applicability

The automated container cap remover and method operates effectively to remove screw-on caps from containers without the use of complex drive and control mechanisms. The use of a nonrotating cap gripping mechanism which moves into engagement with a rotating cap minimizes the likelihood that relative rotation will occur between the container and container support, and the slip clutch drive for the cap gripping mechanism permits the cap to be unscrewed without danger of container damage. The use of the torque displacement curve as a control factor permits the cap remover to operate effectively with containers of varying sizes.

We claim:

1. A method for removing a cap from a container using a cap engaging unit initially spaced from the cap which includes: causing relative rotation to occur between the cap engaging unit and the cap about a rotational axis :substantially parallel or coextensive with the longitudinal axis of said container, maintaining the relative rotation between the cap and cap engaging unit while bringing the cap engaging unit and the cap into engagement by relative movement along said rotational axis, sensing a torque created by the engagement between said cap and cap engaging unit, and moving the cap and cap engaging unit out of engagement in response to a decrease in the sensed torque.

2. The method of claim 1 which includes moving the cap and cap engaging unit out of engagement when the sensed torque decreases substantially to zero.

3. The method of claim 1 which includes sensing a rate of decrease in the torque after the engagement between said cap and cap engaging unit and moving the cap and cap engaging unit out of engagement in response to the rate of decrease in said torque.

4. The method of claim 1 which includes rotating said container to cause relative rotation to occur between the cap engaging unit and cap, and moving the cap engaging unit along said rotational axis to bring the cap engaging unit and cap into engagement.

5. The method of claim 4 which includes moving said cap engaging unit along said rotational axis away from engagement with said cap in response to a decrease in the sensed torque.

6. The method of claim 5 which includes sensing the torque created by the engagement between said cap and cap engaging unit and moving said cap engaging unit away from engagement with said cap in response to the occurrence of a decrease in said torque occurring before said torque drops to zero.

7. The method of claim 6 which includes rotating said container to cause relative rotation to occur between the cap engaging unit and cap, and moving said cap engaging unit along said rotational axis to bring the cap engaging unit and cap into engagement.

* * * * *